US012784931B2

(12) United States Patent
Tang et al.

(10) Patent No.: US 12,784,931 B2
(45) Date of Patent: Nov. 3, 2026

(54) CONDUCTIVE PASTE, PREPARATION METHOD THEREOF, AND PREPARATION METHOD OF CONDUCTIVE FILM

(71) Applicants: Tsinghua University, Beijing (CN); Tencent Technology (Shenzhen) Company Limited, Shenzhen (CN)

(72) Inventors: Jianshi Tang, Beijing (CN); Zhenxuan Zhao, Beijing (CN); Yuan Dai, Shenzhen (CN); Wangwei Lee, Shenzhen (CN); Zhengyou Zhang, Shenzhen (CN); Jian Yuan, Beijing (CN); Huaqiang Wu, Beijing (CN); He Qian, Beijing (CN); Bin Gao, Beijing (CN)

(73) Assignees: TENCENT TECHNOLOGY (SHENZHEN) COMPANY LIMITED, Shenzhen (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/945,373

(22) Filed: Nov. 12, 2024

(65) Prior Publication Data

US 2025/0069772 A1 Feb. 27, 2025

Related U.S. Application Data

(63) Continuation of application No. 17/747,906, filed on May 18, 2022, now Pat. No. 12,170,155, which is a (Continued)

(30) Foreign Application Priority Data

Apr. 28, 2020 (CN) ........................ 202010352024.9

(51) Int. Cl.
*H01B 1/24* (2006.01)
*C08K 3/04* (2006.01)
(Continued)

(52) U.S. Cl.
CPC ............... *H01B 1/24* (2013.01); *C08K 3/041* (2017.05); *C08K 3/045* (2017.05); *C08K 3/046* (2017.05);
(Continued)

(58) Field of Classification Search
CPC .......... H01B 1/24; C08K 3/045; C08K 3/046; C08K 3/041; C09D 7/70
See application file for complete search history.

(56) References Cited

U.S. PATENT DOCUMENTS

2016/0130471 A1* 5/2016 Burrows ............. H05K 1/0326 252/514
2018/0327611 A1 11/2018 Scheffer et al.

FOREIGN PATENT DOCUMENTS

CN 1898753 A 1/2007
CN 101173051 A 5/2008
(Continued)

OTHER PUBLICATIONS

Tencent Technology, ISR/WO, PCT/CN2021/090228, Jul. 30, 2021, 7 pgs.

(Continued)

*Primary Examiner* — Nathan T Leong
(74) *Attorney, Agent, or Firm* — Morgan, Lewis & Bockius LLP

(57) ABSTRACT

This application discloses a conductive paste, a preparation method thereof. The conductive paste comprises: a thermoplastic polyurethane, conductive particles, and an organic solvent, the thermoplastic polyurethane and the conductive particles being proportionally mixed in the organic solvent,
(Continued)

and the thermoplastic polyurethane being dispersed in the form of particles among the conductive particles. A thermoplastic polyurethane elastomer is used as a binder, and the conductive particles are mixed in the organic solvent containing the thermoplastic polyurethane elastomer. The conductive particles ensure the conductivity of the conductive film prepared using the conductive paste. The thermoplastic polyurethane has strong adhesion ability, and is suitable for use on the surface of most substrates, to form a conductive film with good adhesion and no cracking.

3 Claims, 7 Drawing Sheets

Related U.S. Application Data continuation of application No. PCT/CN2021/090228, filed on Apr. 27, 2021.

(51) Int. Cl.

| | |
|---|---|
| ***C09D 5/24*** | (2006.01) |
| ***C09D 7/40*** | (2018.01) |
| ***C09D 7/61*** | (2018.01) |
| ***C09D 175/04*** | (2006.01) |

(52) U.S. Cl.

CPC ................. *C09D 5/24* (2013.01); *C09D 7/61* (2018.01); *C09D 7/70* (2018.01); *C09D 175/04* (2013.01); *C08K 2201/001* (2013.01); *C08K 2201/011* (2013.01)

(56) References Cited

FOREIGN PATENT DOCUMENTS

| | | | |
|---|---|---|---|
| CN | 107001686 | A | 8/2017 |
| CN | 107004458 | A | 8/2017 |
| CN | 109749105 | A | 5/2019 |
| CN | 109754907 | A | 5/2019 |
| CN | 111564236 | A | 8/2020 |
| ES | 2404780 | A1 | 5/2013 |
| JP | H 0680857 | A | 3/1994 |
| KR | 20160108089 | A | 9/2016 |
| KR | 102030066 | B1 | 10/2019 |

OTHER PUBLICATIONS

Tencent Technology, IPRP, PCT/CN2021/090228, Oct. 27, 2022, 6 pgs.

* cited by examiner

CONDUCTIVE PASTE, PREPARATION METHOD THEREOF, AND PREPARATION METHOD OF CONDUCTIVE FILM

CROSS-REFERENCE TO RELATED APPLICATIONS

This application is a continuation of U.S. patent application Ser. No. 17/747,906, entitled "CONDUCTIVE PASTE, PREPARATION METHOD THEREOF, AND PREPARATION METHOD OF CONDUCTIVE FILM" filed on May 18, 2022, which is a continuation application of PCT Patent Application No. PCT/CN2021/090228, entitled "CONDUCTIVE PASTE, PREPARATION METHOD THEREOF, AND PREPARATION METHOD OF CONDUCTIVE FILM" filed on Apr. 27, 2021, which claims the priority of Chinese Patent Application No. 202010352024.9 filed on Apr. 28, 2020 and entitled "CONDUCTIVE PASTE, PREPARATION METHOD THEREOF, AND PREPARATION METHOD OF CONDUCTIVE FILM", both of which are incorporated in this application by reference in their entirety.

FIELD OF THE TECHNOLOGY

This application relates to the field of electronic devices, and in particular, to a conductive paste, a preparation method thereof, and a preparation method of a conductive film.

BACKGROUND OF THE DISCLOSURE

Conductive paste is a key material for electronic component packaging, and electrode/electrode interconnection, and includes conductive adhesives and conductive inks according to the application scenarios. The conductive paste is conductive after curing or drying, and generally comprises, as main components, a matrix resin, and a conductive filler, that is, conductive particles. The conductive particles are bonded together by the bonding effect of the matrix resin to form a conductive path to realize the conductive connection between bonded materials.

At present, the commercially available conductive pastes mainly include epoxy-based, silicone-based, and polymer-based conductive pastes according to the matrix, and carbon conductive pastes and silver conductive pastes according to the conductive particles.

Among them, a conductive film formed after curing of a silicone-based conductive paste is soft, but the bonding strength is poor. Particularly, the polymer in a conductive ink has basically no adhesion, such that the conductive film formed by the conductive ink is prone to cracking, peeling, and the like, and the adhesion is poor.

SUMMARY

In view of the above-mentioned defects or deficiencies in the related art, a conductive paste, a preparation method thereof, and a preparation method of a conductive film are provided. In the conductive paste, a thermoplastic polyurethane is used as a binder, to overcome the technical problem of poor attachment of the conductive film formed by the conductive paste in the related art.

In a first aspect, a conductive paste is provided, which comprises: a thermoplastic polyurethane, conductive particles, and an organic solvent. The conductive particles and the thermoplastic polyurethane are mixed in the organic solvent at a weight ratio of 3:7 to 95:5, and the thermoplastic polyurethane is dispersed in the form of particles among the conductive particles.

In a second aspect, a method for preparing a conductive paste is provided, where the conductive paste is a conductive paste as described in the first aspect, and the method comprises:

dispersing conductive particles in an organic solvent proportionally to obtain a first dispersion;

dispersing a thermoplastic polyurethane in an organic solvent proportionally to obtain a second dispersion; and mixing the first dispersion and the second dispersion proportionally to obtain the conductive paste, where the weight ratio of the conductive particles and the thermoplastic polyurethane is 3:7 to 95:5, and the thermoplastic polyurethane is dispersed in the form of particles between the conductive particles.

In a third aspect, a method for preparing a conductive film is provided, which comprises obtaining a conductive paste as described in the first aspect;

coating the obtained conductive paste on a substrate; and drying the conductive paste coated on the substrate to obtain the conductive film, wherein the weight ratio of the conductive particles and thermoplastic polyurethane in the conductive paste is 3:7 to 95:5.

To sum up, embodiments of this application provide a conductive paste, a preparation method thereof, and a preparation method of a conductive film. A thermoplastic polyurethane is used as a binder, and the thermoplastic polyurethane is mixed with conductive particles at a weight ratio of 3:7 to 95:5. The thermoplastic polyurethane is a cross-linked polymer having strong adhesion, and can be coated on the surface of most substrates, to form a conductive film with good adhesion and no cracking. In addition, because the thermoplastic polyurethane is uniformly dispersed and wrapped outside the conductive particles, the failure caused by agglomeration of conductive particles is effectively prevented during the storage process of the conductive paste. Therefore, the resulting conductive paste can be stored for a long time at room temperature.

BRIEF DESCRIPTION OF THE DRAWINGS

Other features, objectives, and advantages of this application become more obvious by reading the detailed description of non-limiting embodiments that is provided with reference to the following accompanying drawings.

DESCRIPTION OF EMBODIMENTS

This application is further described in detail below with reference to the accompanying drawings and embodiments. It may be understood that, content of specific embodiments described herein is merely used for describing this application rather than limiting this application. In addition, for ease of description, only parts related to the embodiments are shown in the accompanying drawings.

The embodiments in this application and features in the embodiments may be combined with each other in the case of no conflict. This application is described in detail below with reference to the drawings and the embodiments.

It can be understood that in the preparation of a conductive film for an electronic device, a conductive paste is needed. The currently commercially available conductive pastes have problems that the film formed therewith is hard and prone to cracking, and has poor viscosity, or difficulty in storage. To solve the above problems, in this application, a thermoplastic polyurethane is used as a binder in the conductive paste. The thermoplastic polyurethane is a cross-linked polymer having strong adhesion and can be applied to the surface of most substrates to form a conductive film with stable performance. In addition, since the thermoplastic polyurethane and the conductive particles are uniformly dispersed in the organic solvent, the agglomeration of the conductive particles in the conductive paste is effectively prevented, thereby effectively preventing the failure in electrical conductivity of the conductive past, and overcoming the problem of harsh storage conditions.

To better understand the conductive paste, the preparation method thereof, and the method for preparing a conductive film with the prepared conductive paste provided in the embodiments of this application, the following embodiments are described in detail with reference to FIG. 1 to FIG. 13.

The conductive paste according to an embodiment of this application may include a thermoplastic polyurethane, conductive particles, and an organic solvent, where the thermoplastic polyurethane and the conductive particles are mixed in the organic solvent proportionally.

In some embodiments, the thermoplastic polyurethane is dispersed in the organic solvent at room temperature. In the conductive paste, the thermoplastic polyurethane is dispersed in the form of particles among the conductive particles.

In some embodiments, the conductive particles may be carbon conductive particles, such as carbon nanomaterials, including graphene, conductive carbon black (such as Super P powder), carbon nanotubes, carbon nanospheres, carbon nanofibers, and the like.

It can be understood that the conductive particles may also be nano-scale silver conductive particles and the like.

Figure 1:
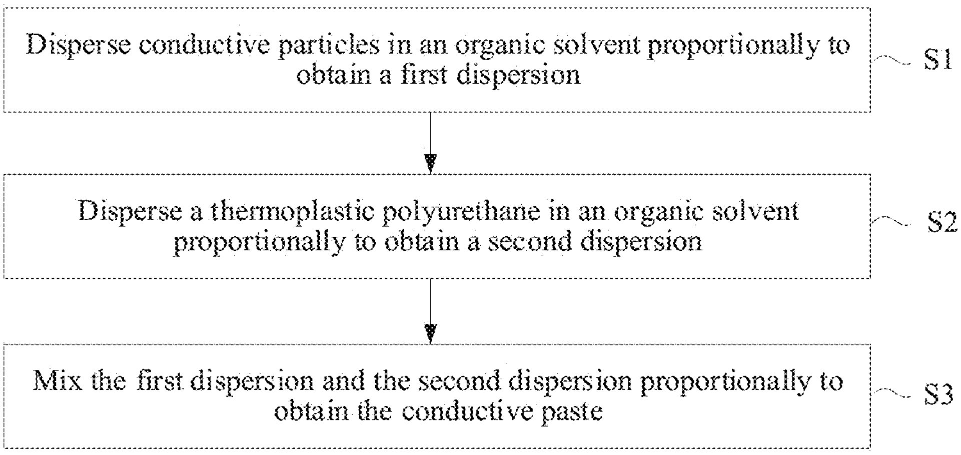
FIG. 1 is a process flow chart of a method for preparing a conductive paste according to an embodiment of this application.

In some embodiments, the weight ratio of the conductive particles to the thermoplastic polyurethane is 3:7 to 95:5. Further, to better understand the conductive paste, in practice, the conductive paste can be prepared by the following steps (S1 to S3) as shown in FIG. 1:

- S1: dispersing conductive particles in an organic solvent proportionally to obtain a first dispersion;
- S2: dispersing a thermoplastic polyurethane in an organic solvent proportionally to obtain a second dispersion; and
- S3: mixing the first dispersion and the second dispersion proportionally to obtain the conductive paste.

In some embodiments, the thermoplastic polyurethane is proportionally dispersed in the organic solvent at room temperature to obtain the second dispersion, where the thermoplastic polyurethane is dispersed in the form of particles among the conductive particles.

It can be understood that in the embodiments of this application, by setting the weight ratio of the conductive particles and the thermoplastic polyurethane as desired, the prepared conductive pastes have different properties, so that the conductive films further prepared with the prepared conductive pastes exhibit different electrical conductivities and different adhesion abilities (that is, the conductive films further prepared with the prepared conductive pastes at different weight ratios have different technical parameters/performance parameters such as different conductivities and different adhesion abilities). Wherever the adhesion ability is needed to be improved, the content of the thermoplastic polyurethane binder can be appropriately increased; and the content of the conductive particles can be increased where a higher electrical conductivity is required.

The organic solvent may include one or more of a mixture of N-methylpyrrolidone and N,N-dimethylformamide, N-methylpyrrolidone, and tetrahydrofuran.

It is to be understood that the organic solvent corresponding to the first dispersion and the organic solvent corresponding to the second dispersion may be the same organic solvent or different organic solvents, which are not specifically limited in the embodiments of this application.

It can be understood that when the conductive particles in the conductive paste provided in the embodiments of this application are carbon conductive particles, the carbon conductive particles and the thermoplastic polyurethane are uniformly dispersed in the organic solvent to form the conductive paste. Due to the effect of the thermoplastic polyurethane in combination with the organic solvent, defective sites on the carbon conductive particles can be repaired, to effectively prevent the agglomeration of carbon conductive particles in the conductive paste during the storage of the conductive paste, thereby preventing the reduction or loss of electrical conductivity thus caused and ensuring a long service life of the conductive paste.

Alternatively, when the conductive particles are nano-scale silver conductive particles, the thermoplastic polyurethane, as a cross-linked polymer, can also be uniformly dispersed outside the silver conductive particles, so that the silver conductive particles are evenly dispersed in the binder to prevent the agglomeration of conductive particles.

In the conductive paste provided in the embodiments of this application, the thermoplastic polyurethane and the conductive particles are mixed proportionally, and high-quality (that is, highly electrically conductive) conductive particles are filled, which ensures the conductivity of the conductive paste. The thermoplastic polyurethane is a cross-linked polymer having strong adhesion and can be applied to the surface of most substrates to form a conductive film with good adhesion and no cracking. In addition, since the thermoplastic polyurethane and the conductive particles are uniformly dispersed in the organic solvent, the failure in electrical conductivity of the paste caused by agglomeration of conductive particles in the conductive paste is effectively prevented. Therefore, the resulting conductive paste can be stored for a long time at room temperature.

Room temperature refers to indoor temperature, also known as normal temperature. In some embodiments, room temperature refers to a temperature between 15 and 40° C., such as 18° C., 20° C., 25° C., 28° C., and so on. In the related art, the solid thermoplastic polyurethane is directly melted into a liquid state in a high-temperature environment, which causes more bubbles in the conductive paste prepared based on the molten thermoplastic polyurethane, so the thickness of a further prepared conductive film is large. Moreover, the thermoplastic polyurethane in molten state has poor isolation effect for conductive particles. In the embodiments of this application, the thermoplastic polyurethane is dispersed in the organic solvent at room temperature, that is, the second dispersion can be obtained by mixing at room temperature. The conductive paste prepared with the second dispersion obtained at room temperature can be cured into a conductive film with a smaller thickness on the surface of the substrate. Because the thermoplastic polyurethane does not need to be heated, use of the second dispersion obtained at room temperature can reduce the bubbles in the conductive paste and the conductive film and improve the uniformity in thickness of the conductive film prepared with the conductive paste. In addition, in the conductive paste prepared with the second dispersion obtained at room temperature, the thermoplastic polyurethane is dispersed in the form of particles among the conductive particles, such that the conductive particles are separated from each other, without affecting the electrical conductivity of the conductive particles. This further prevents the failure of the conductive paste caused by the agglomeration of carbon conductive particles in the conductive paste, thereby further ensuring that the conductive paste can be stored for a long time at room temperature.

To better understand the preparation method of the conductive paste provided in the embodiments of this application, detailed description is made hereinafter with reference to several exemplary embodiments.

In an exemplary embodiment:

S11: Disperse 30 g of carbon conductive particles in 30 g-30000 g of an organic solvent, for example, in a mixture of N-methylpyrrolidone and N,N-dimethylformamide, or in N-methylpyrrolidone, to give a first dispersion.

It can be understood that the weight ratio of the carbon nanomaterial powder (i.e., carbon conductive particles with a smaller diameter) to the organic solvent can be 1:1 to 1:1000. The organic solvent may be N-methylpyrrolidone, or a mixed solution of N-methylpyrrolidone and N,N-dimethylformamide.

Figure 2:
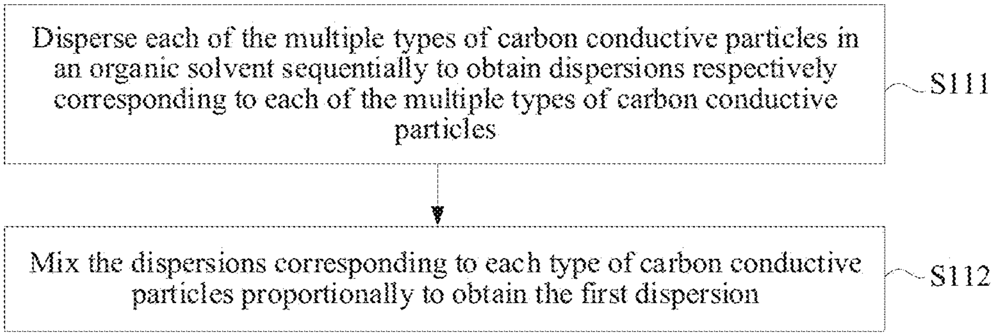
FIG. 2 is a process flow chart of a method for preparing a conductive paste according to another embodiment of this application.

In this step, as shown in FIG. 2, step S11 may specifically include the following steps (S111-S112):

S111: Disperse each of the multiple types of carbon conductive particles in an organic solvent sequentially to obtain dispersions respectively corresponding to each of the multiple types of carbon conductive particles.

S112: Mix the dispersions corresponding to each type of carbon conductive particles proportionally to obtain the first dispersion.

Particularly, to obtain a dispersion in which the carbon conductive particles and the organic solvent are fully mixed, each type of carbon conductive particles can be added to a certain amount of organic solvent, and then the dispersions corresponding to each type of carbon conductive particles are mixed at a certain weight ratio or volume ratio, to obtain the first dispersion.

For example, 10 g of carbon nanotubes, 10 g of graphene, and 10 g of carbon nanospheres can be dispersed in 3 portions of organic solvent in a room-temperature environment, respectively, to obtain a carbon nanotube dispersion, a graphene dispersion, and a carbon nanosphere dispersion. The organic solvent may be 30 g of N-methylpyrrolidone, or a mixed solution of N-methylpyrrolidone and N,N-dimethylformamide. Finally, the carbon nanotube dispersion, the graphene dispersion, and the carbon nanosphere dispersion are mixed at a weight ratio of 1:1:1 to obtain a dispersion of carbon conductive particles, that is, the first dispersion.

In some embodiments, in this step, for the purpose of rapid dispersion to enhance the dispersity of carbon conductive particles, the carbon conductive particles can be deeply dispersed with the aid of an ultrasonic cell homogenizer.

S12: Disperse 70 g of a thermoplastic polyurethane in 140 g-3500 g of an organic solvent to obtain a second dispersion.

In some embodiments, 70 g of a thermoplastic polyurethane is dispersed in 140 g-3500 g of an organic solvent at room temperature to obtain the second dispersion. For example, 70 g of a thermoplastic polyurethane as a cross-linked polymer is fully dissolved in N,N-dimethylformamide in a room-temperature environment to obtain the second dispersion. The weight ratio of the thermoplastic polyurethane as a cross-linked polymer and N,N-dimethylformamide may be 1:1 to 1:1000. The temperature corresponding to the room-temperature environment may be 20° C. and 25° C., etc., which is specifically set by relevant technical personnel, and not particularly limited in the embodiments of this application.

In some embodiments, in this step, the thermoplastic polyurethane can be facilitated to disperse by magnetic stirring, for example, a magnetic stirrer or a mechanical stirrer is used to accelerate the dissolution of the thermoplastic polyurethane and improve the uniformity in dispersion of the thermoplastic polyurethane.

S13: Mix the first dispersion and the second dispersion to obtain a conductive paste with a weight ratio of carbon conductive particles and thermoplastic polyurethane of 3:7.

In some embodiments, the thermoplastic polyurethane is dispersed in the form of particles among the conductive particles.

Particularly, the first dispersion containing 30 g of carbon conductive particles and the second dispersion containing 70 g of thermoplastic polyurethane obtained in steps 1 and 2 are added to a vessel (where no particular order is limited), and thoroughly mixed. For example, the dispersions are fully mixed by manual stirring, or stirring with a magnetic stirrer or mechanical stirrer, to obtain a conductive paste with the thermoplastic polyurethane as a binder, where the weight ratio of the carbon conductive particles and the thermoplastic polyurethane in the conductive paste is 3:7.

It can be understood that in the embodiments of this application, the weight ratio of the conductive particles and the organic solvent, and the weight ratio of the thermoplastic polyurethane and the organic solvent are not strictly limited, as long as the conductive particles and the thermoplastic polyurethane can be dispersed in the organic solvent.

In the embodiments of this application, by using carbon conductive particles as a conductive material in the conductive paste, good electrical conductivity is ensured; and the weight ratio of the carbon conductive particles to the thermoplastic polyurethane is set to 3:7, so that the prepared conductive paste has good adhesion ability, and can be applied to a curved and smooth substrate surface, thus being suitable for use in fabricating flexible electronic devices. In addition, due to the isolation effect of the thermoplastic polyurethane for the carbon conductive particles, failure of the conductive paste caused by agglomeration of conductive particles in the conductive paste is effectively prevented. Therefore, the conductive paste can be stored for a long time at room temperature.

In an exemplary embodiment:

S201: Disperse 60 g of carbon conductive particles in 180 g-6000 g of an organic solvent, for example, in a mixture of N-methylpyrrolidone and N,N-dimethylformamide (1:1 to 1:20), or in N-methylpyrrolidone, to give a first dispersion.

For example, 20 g of carbon nanotubes, 20 g of graphene, and 20 g of carbon nanospheres can be dispersed in 3 portions of organic solvent in a room-temperature environment, respectively, to obtain a carbon nanotube dispersion, a graphene dispersion, and a carbon nanosphere dispersion. The organic solvent may be 1000 g of N-methylpyrrolidone, or a mixed solution of N-methylpyrrolidone and N,N-dimethylformamide. Finally, the carbon nanotube dispersion, the graphene dispersion, and the carbon nanosphere dispersion are mixed to obtain a dispersion of carbon conductive particles.

S202: Disperse 40 g of a thermoplastic polyurethane in 80 g-2000 g of an organic solvent to obtain a second dispersion.

In some embodiments, 40 g of a thermoplastic polyurethane is dispersed in 80 g-2000 g of an organic solvent at room temperature to obtain the second dispersion.

S203: Mix the first dispersion and the second dispersion to obtain a conductive paste with a weight ratio of conductive particles and thermoplastic polyurethane of 3:2.

It can be understood that in the embodiments of this application, the specific processes for preparing the carbon conductive particle dispersion, the thermoplastic polyurethane dispersion, and the conductive paste are similar to the exemplary embodiments described in S11 to S13, and are not described here again.

In the embodiments of this application, by using carbon conductive particles as a conductive material in the conductive paste, and setting the weight ratio of the carbon conductive particles to the thermoplastic polyurethane to 3:2, the prepared conductive paste has good electrical conductivity and adhesion ability, and can be applied to a curved and smooth substrate surface or applicable to the fabrication of flexible electronic devices. Similarly, due to the isolation effect of the thermoplastic polyurethane for the carbon conductive particles, failure of the paste caused by agglomeration of conductive particles in the conductive paste is effectively prevented. Therefore, the conductive paste can be stored for a long time at room temperature.

In an exemplary embodiment:

S31: Disperse 95 g of carbon conductive particles in 285 g-9500 g of an organic solvent, for example, in a mixture of N-methylpyrrolidone and N,N-dimethylformamide (1:1 to 1:20), or in N-methylpyrrolidone, to give a first dispersion.

For example, 30 g of carbon nanotubes, 30 g of graphene, and 35 g of carbon nanospheres can be dispersed in 3 portions of organic solvent in a room-temperature environment, respectively, to obtain a carbon nanotube dispersion, a graphene dispersion, and a carbon nanosphere dispersion. The organic solvent may be 1000 g of N-methylpyrrolidone, or a mixed solution of N-methylpyrrolidone and N,N-dimethylformamide. Finally, the carbon nanotube dispersion, the graphene dispersion, and the carbon nanosphere dispersion are mixed to obtain a dispersion of carbon conductive particles.

S32: Disperse 5 g of a thermoplastic polyurethane in 10 g-250 g of an organic solvent to obtain a second dispersion.

In some embodiments, 5 g of a thermoplastic polyurethane is dispersed in 10 g-250 g of an organic solvent at room temperature to obtain the second dispersion.

S33: Mix the first dispersion and the second dispersion to obtain a conductive paste with a weight ratio of carbon conductive particles and thermoplastic polyurethane of 95:5.

In some embodiments, the thermoplastic polyurethane is dispersed in the form of particles among the conductive particles.

It can be understood that in the embodiments of this application, the specific processes for preparing the carbon conductive particle dispersion, the thermoplastic polyurethane dispersion, and the conductive paste are similar to the exemplary embodiments described in S1 to S13, and are not described here again.

In the embodiments of this application, by using carbon conductive particles as a conductive material in the conductive paste, good electrical conductivity of the conductive paste is ensured; and the weight ratio of the carbon conductive particles to the thermoplastic polyurethane in the conductive paste is set to 95:5, that is, a high weight ratio of conductive particles is present in the prepared conductive paste, to ensure that the prepared conductive paste has good electrical conductivity.

Similarly, the thermoplastic polyurethane ensures the adhesion ability of the conductive paste, makes the conductive paste suitable for the fabrication of flexible electronic devices, and can effectively prevent failure of the paste caused by agglomeration of conductive particles in the conductive paste. Therefore, the conductive paste can be stored for a long time at room temperature.

Further, to better understand the properties of the conductive paste provided in the embodiments of this application, the properties of the currently commercially available conductive pastes and the conductive paste provided in the embodiments of this application are compared, as shown in Table 1:

TABLE 1

| Name | Method of use | Curing condition | Storage condition | Service life | Bendable or not | Electrical conductivity | Removable or not |
|---|---|---|---|---|---|---|---|
| Common silver conductive paste | Direct use by only brush coating | Room temperature | Storage at low temperature while sealed | Very short (where a highly volatile organic solvent is used and the paste needs to be used up immediately after unpacking) | Not | Poor | Not |
| Stretchable conductive silver paste | Direct use by brush coating or spray coating | Curing at room temperature followed by baking at 75° C. for 2 min | Storage at 15° C. or lower while sealed | 6 months after unpacking | Yes | Good conductivity of <0.010 ohms/sq @ 1.0 mil | Yes |
| Carbon conductive adhesive | Graphite powder of two mixed reagents and liquid reagent Extender mixed proportionally Only by brush coating | 120° C. for 10 min | Storage at room temperature while sealed | 6 months after unpacking | Not | Poor conductivity of <2400 ohms/sq @25 μm (1 mil) | Not |
| Self-made conductive paste | Direct use by brush coating, spray coating and other processes | Curing at room temperature followed by baking at 75° C. for 2 min | Storage at room temperature while sealed | No expiration date | Yes | Good conductivity, close to that of multi-walled carbon nanotubes | Yes |

As can be seen from Table 1, the conductive paste according to the embodiments of this application is convenient in use, easy to remove and store, and has good electrical conductivity. It can be used in packaging of semiconductor microelectronic devices and other scenarios.

In addition, due to the high cost of silver nanomaterial in the silver conductive pastes, the preparation cost of silver conductive pastes is relatively high. The conductive paste in the present application is suitable for large-scale production due to the convenient preparation of carbon conductive particles and low cost.

Figure 12:
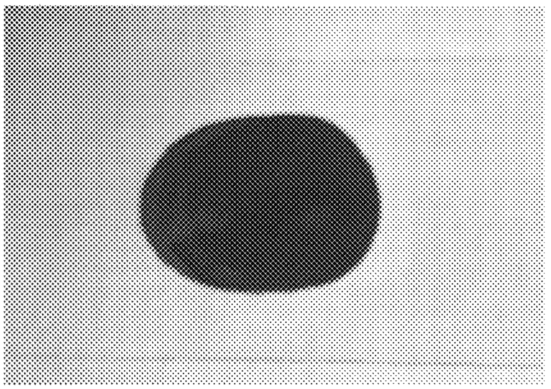
FIG. 12 shows the state of a conductive paste according to an embodiment of this application after 80 days of standing on a glass plate.
Figure 13:
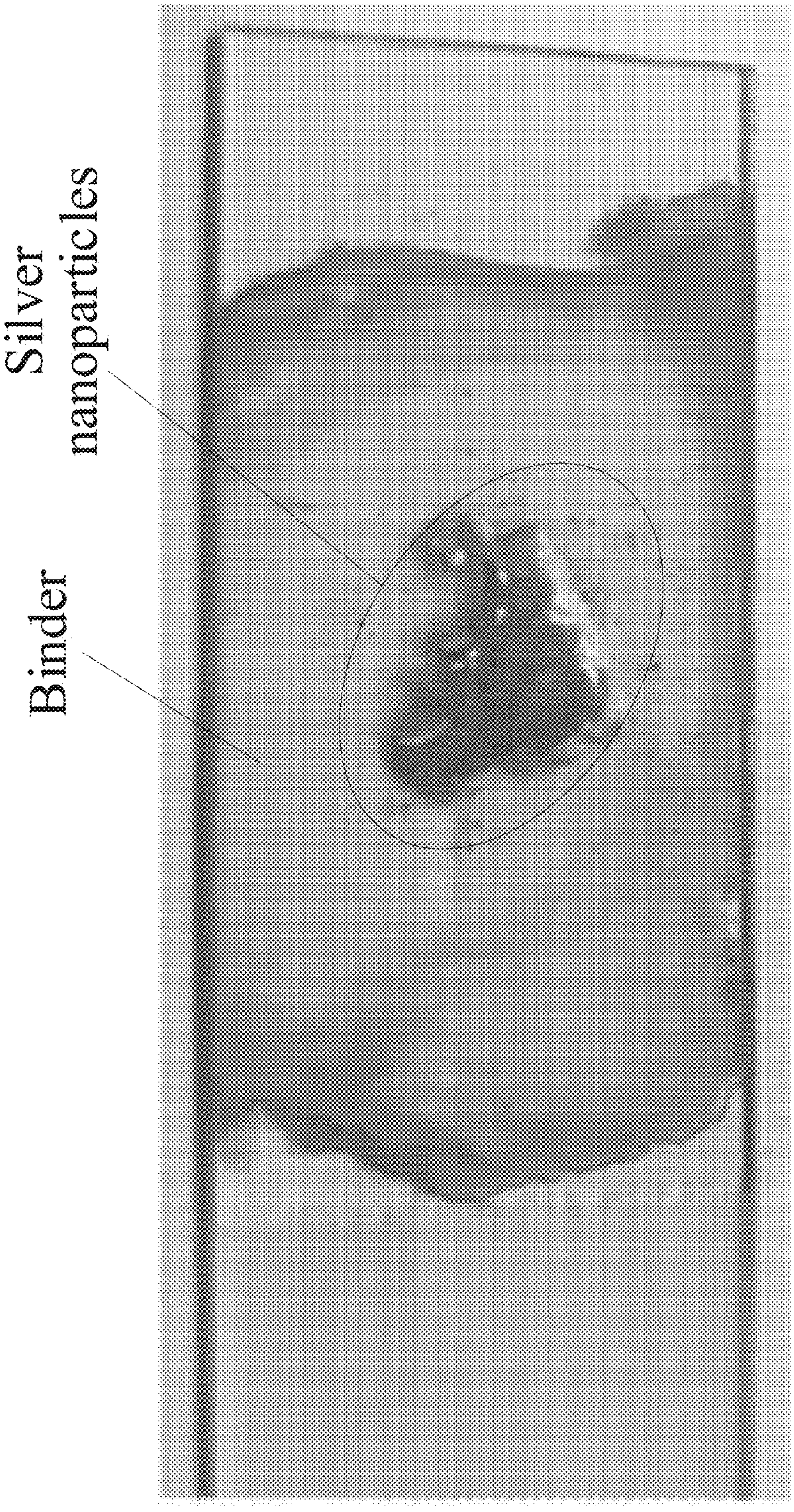
FIG. 13 shows the state of a silver conductive paste in the related art after 80 days of standing on a glass plate.

Further, the storage time of the conductive paste prepared in the embodiments of this application and the currently commercially available silver conductive paste while stored at 2° C. is tested. FIG. 12 shows the effect of the conductive paste prepared in the embodiments of this application on a glass substrate after 80 days at room temperature. FIG. 13 shows the effect of a currently commercially available silver conductive paste coated on a glass substrate after 80 days of storage at 2° C.

As can be seen from FIG. 12, for the conductive paste prepared by using a thermoplastic polyurethane as a binder in the embodiments of this application, the binder and the conductive particles are still in a well mixed state after storage for 80 days.

It can be seen from FIG. 13 that the currently commercially available silver conductive paste suffers from the problems of agglomeration of silver conductive particles and layering of the binder and the conductive particles after storage for 80 days.

In another aspect, an embodiment of this application also provides a method for preparing a conductive film. That is, the conductive paste prepared in the embodiments of this application can be used in electronic devices. Specifically, the conductive paste can be used in electronic devices to prepare a conductive film.

Figure 3:
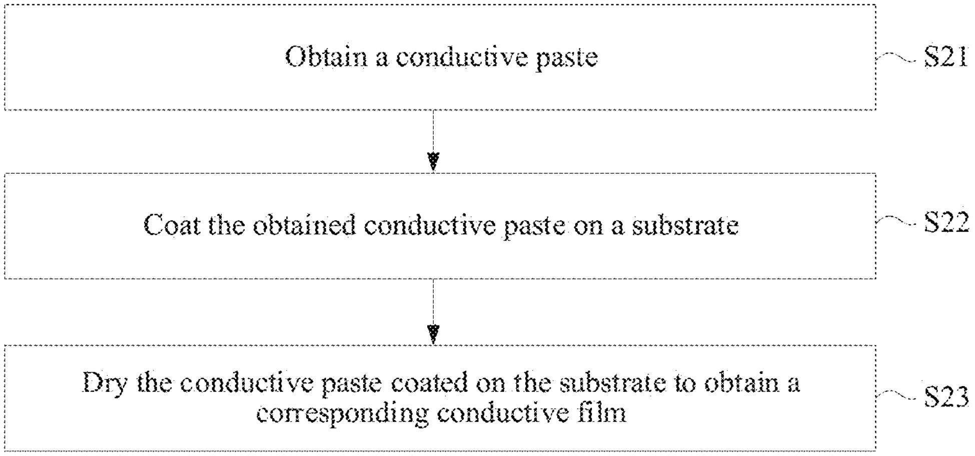
FIG. 3 is a process flow chart of a method for preparing a conductive film according to an embodiment of this application.

As shown in FIG. 3, the method for preparing a conductive film may include:

S21: obtaining a conductive paste;

S22: coating the obtained conductive paste on a substrate; and

S23: drying the conductive paste coated on the substrate to obtain a corresponding conductive film.

Particularly, the conductive paste provided in the embodiments of this application can be applied to the preparation of a conductive path in an electronic device, for example, the preparation of electrode wires of electronic devices, or data lines and common lines in display panels.

In practice, the conductive paste prepared in the above-mentioned embodiments is coated on a substrate, and then the organic solvent is fully volatilized by thermal drying, ultraviolet irradiation, or heating by a heat plate, to prepare a conductive film, where the weight ratio of the conductive particles to the thermoplastic polyurethane is 3:7 to 95:5.

For example, the resulting conductive paste can be coated on various substrates by means of spin coating, printing, blade coating, printing, and the like. In some embodiments, the substrate is a glass substrate, a fiber substrate, a plastic substrate, a metal substrate, and the like.

Figure 4:
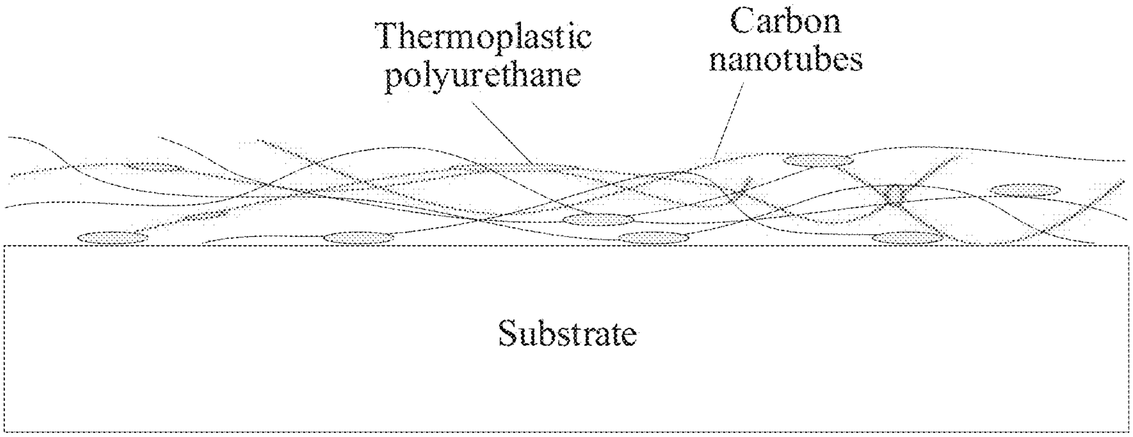
FIG. 4 is a schematic structural view of a conductive film formed on a glass substrate according to an embodiment of this application.

FIG. 4 is a schematic structural view of a conductive film prepared by coating on a conductive paste with carbon nanotubes as conductive particles on a glass substrate by blade coating and then drying.

Figure 5:
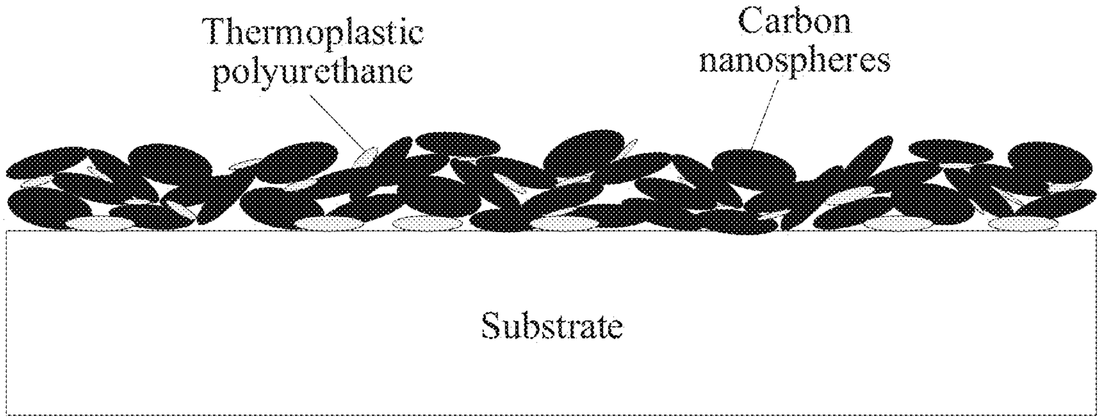
FIG. 5 is a schematic structural view of a conductive film formed on a glass substrate according to another embodiment of this application.

FIG. 5 is a schematic structural view of a conductive film prepared by coating on a conductive paste with carbon nanospheres as conductive particles on a glass substrate by blade coating and then drying.

It can be seen from FIG. 4 that in the conductive film formed by using carbon nanotubes as conductive particles, the binder thermoplastic polyurethane is uniformly dispersed around the carbon nanotubes, and serves to bond the carbon nanotubes, and bond the carbon nanotubes to the substrate. In addition, the thermoplastic polyurethane is adhered in the form of small particles and does not exist in the form of large particles, which avoids the situation of isolating two carbon nanotubes, thereby ensuring the good electrical conductivity of the conductive film.

Similarly, it can be seen from FIG. 5 that in the conductive film formed by using carbon nanospheres as conductive particles, the binder thermoplastic polyurethane is uniformly dispersed around the carbon nanospheres, and serves to bond the carbon nanospheres, and bond the carbon nanospheres to the substrate. Moreover, the thermoplastic polyurethane is similarly adhered in the form of small particles and does not exist in the form of large particles, which avoids the situation of isolating multiple carbon nanospheres, thereby ensuring the good electrical conductivity of the conductive film.

It can be understood that in the conductive film formed by using graphene as conductive particles, the binder thermoplastic polyurethane is similarly uniformly dispersed above and below the carbon nanotubes, and serves to bond the graphene sheets, and bond graphene to the substrate.

Figure 6:
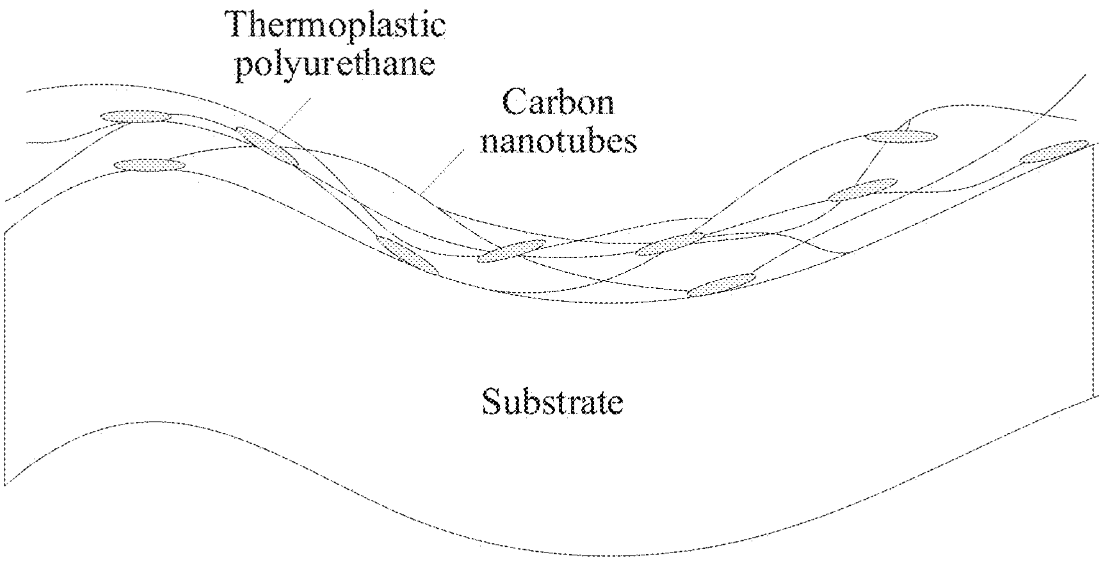
FIG. 6 is a schematic structural view of a conductive film formed on a flexible substrate according to another embodiment of this application.
Figure 7:
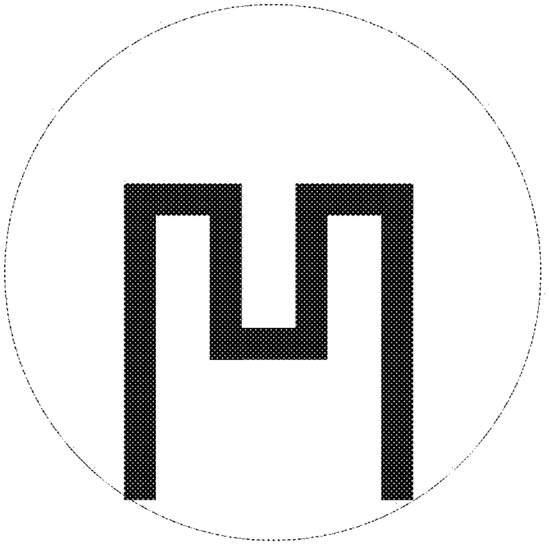
FIG. 7 is a schematic structural view of a conductive film formed on a substrate according to another embodiment of this application.
Figure 8:
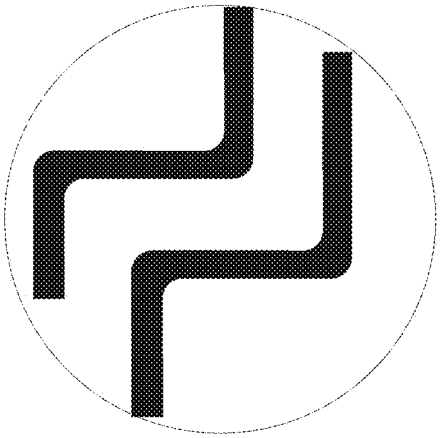
FIG. 8 is a schematic structural view of a conductive film formed on a substrate according to another embodiment of this application.
Figure 9:
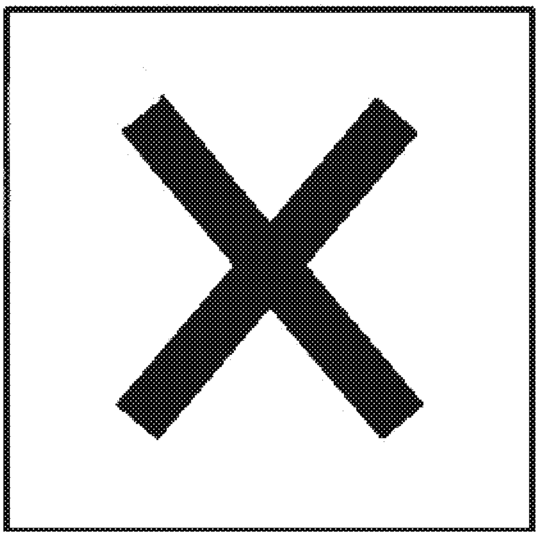
FIG. 9 is a schematic structural view of a conductive film formed on a substrate according to another embodiment of this application.
Figure 10:
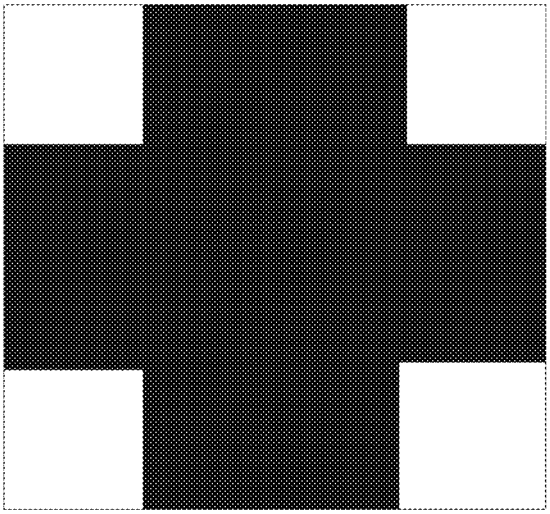
FIG. 10 is a schematic structural view of a conductive film formed on a substrate according to another embodiment of this application.
Figure 11:
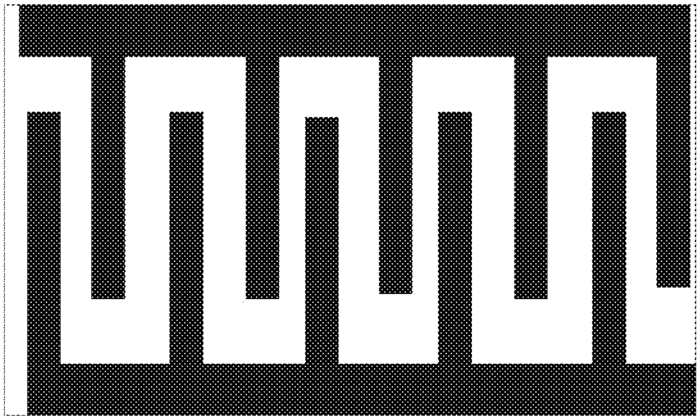
FIG. 11 is a schematic structural view of a conductive film formed on a substrate according to another embodiment of this application.

FIG. 6 is a schematic structural view of a conductive film formed by coating on a conductive paste with carbon nanotubes as conductive particles on a flexible plastic substrate by blade coating and then drying.

As can be seen from FIG. 6, after the film is formed and cured, the conductive film formed by the conductive paste will not crack or fall off.

Further, FIG. 7 to FIG. 11 show schematic structural views of conductive films formed by coating the conductive paste on a glass substrate by printing, spraying or other processes and then drying.

As can be seen, the conductive paste provided in the embodiments of this application, the prepared conductive paste can be coated on most substrates through various coating processes to form conductive films of various shapes.

In some embodiments, in an embodiment, after the conductive paste is coated on a substrate to form a conductive film, N-methylpyrrolidone can also be used to remove the conductive film.

In some embodiments, in the above-mentioned various application scenarios and processes, different application scenarios have different requirements on the viscosity of the conductive paste. For example, when a conductive film is formed through a process such as blade coating, a conductive paste with a high viscosity is required. In another example, when the conductive film is formed by a process such as printing or spray coating, a conductive paste with a low viscosity can be used.

That is, in the embodiments of this application, before the conductive paste is coated on a substrate, the viscosity of the conductive paste can also be adjusted according to the requirements of the application scenario to obtain a conductive paste that meets the viscosity requirement, such as a conductive adhesive with a higher viscosity, or a conductive ink with a lower viscosity.

Particularly, the method includes the following steps:

obtaining a conductive paste provided in the above embodiments;

heating the obtained conductive paste to volatilize the organic solvent therein so as to obtain a conductive paste with a preset viscosity; or adding an organic solvent to the obtained conductive paste to dilute the conductive paste so as to obtain a conductive paste with a preset viscosity.

For example, when a conductive paste with a high viscosity such as a conductive adhesive, is required, the prepared conductive paste can be heated in a heat source environment at a low temperature to volatilize excess organic solvent. At the same time, auxiliary operations such as manual stirring, magnetic stirring or mechanical stirring can be used to speed up the volatilization of the organic solvent, and the heating can be stopped when the viscosity of the conductive paste reaches the required viscosity, so as to obtain a conductive adhesive with a moderate viscosity.

In another example, when a conductive paste with a low viscosity is needed, the conductive paste can be diluted. If the conductive paste is directly diluted with an organic solvent, the diluent can also be selected from N-methylpyrrolidone, N,N-dimethylformamide or a mixed solvent thereof. An amount of a diluent is gradually added to the conductive paste, and fully mixed with the conductive paste with the aid of manual stirring, magnetic stirring, or mechanical stirring to speed up the dilution, until a certain viscosity is achieved to obtain the desired conductive adhesive or conductive ink.

To sum up, embodiments of this application provide a conductive paste, a preparation method thereof, and a method of use. A thermoplastic polyurethane elastomer is used as a binder, and conductive particles is mixed in the solvent thermoplastic polyurethane elastomer. The conductive filler (i.e., conductive particles) ensures the conductivity of the conductive film. The thermoplastic polyurethane is a cross-linked polymer having strong adhesion, and can be applied on the surface of curved or smooth substrates, to form a conductive film with good adhesion and no cracking. In addition, because the thermoplastic polyurethane is uniformly dispersed and wrapped outside the conductive particles, the failure of paste caused by agglomeration of conductive particles is effectively prevented during the storage process of the conductive paste. Therefore, the resulting conductive paste can be stored for a long time at room temperature.

The foregoing descriptions are merely preferred embodiments of this application and descriptions of the technical principles used. A person skilled in the art is to understand that the scope of the embodiments of this application is not limited to the technical solutions that are formed by the foregoing particular combinations of technical features, but shall also encompass other technical solutions formed by arbitrarily combining the foregoing technical features or equivalent features thereof without departing from the concept of the foregoing embodiments. For example, technical solutions formed by replacing the foregoing features with technical features having similar functions disclosed in this application (but not limited thereto) are also included.

What is claimed is:

1. A conductive paste, comprising a thermoplastic polyurethane, conductive particles, and an organic solvent, wherein the conductive particles and the thermoplastic polyurethane is mixed in the organic solvent at a weight ratio of the conductive particles and the thermoplastic polyurethane ranging from 3:7 to 95:5, the organic solvent includes a mixture of N-methylpyrrolidone and N,N-dimethylformamide and the thermoplastic polyurethane is dispersed in the organic solvent in the form of particles among the conductive particles for repairing defective sites on the conductive particles such that the conductive particles are in a conductively connected and evenly dispersive state under room temperature.

2. The conductive paste according to claim 1, wherein the conductive particles comprise carbon conductive particles.

3. The conductive paste according to claim 2, wherein the carbon conductive particles comprise one or more of graphene, conductive carbon black, carbon nanotubes, carbon nanospheres and carbon nanofibers.

* * * * *